May 19, 1931.　　　J. F. LAWSON　　　1,805,549
ELECTRIC WELDING
Filed Aug. 27, 1925　　3 Sheets-Sheet 1
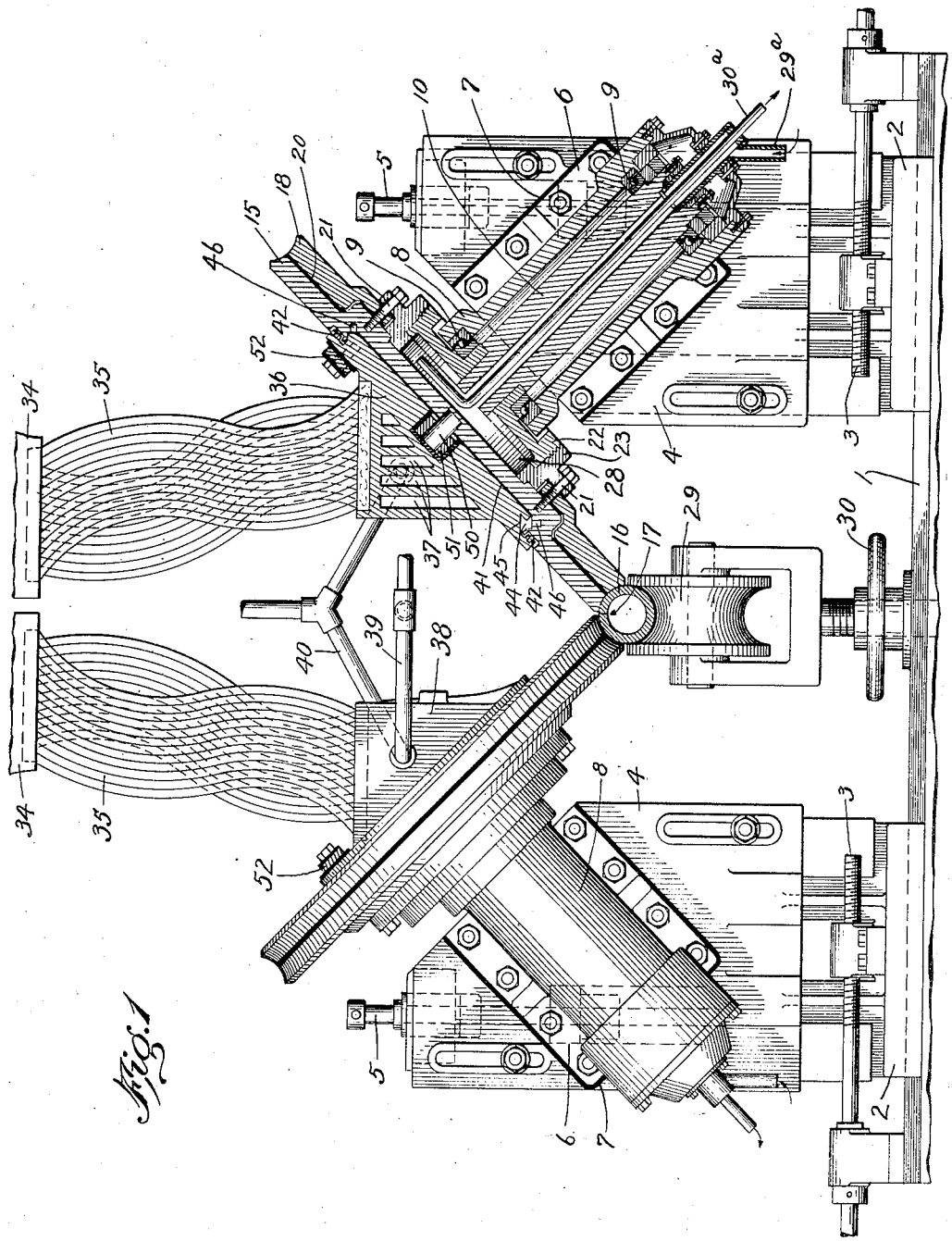
Fig.1
INVENTOR
ATTORNEY May 19, 1931.  J. F. LAWSON  1,805,549
ELECTRIC WELDING
Filed Aug. 27, 1925  3 Sheets-Sheet 2
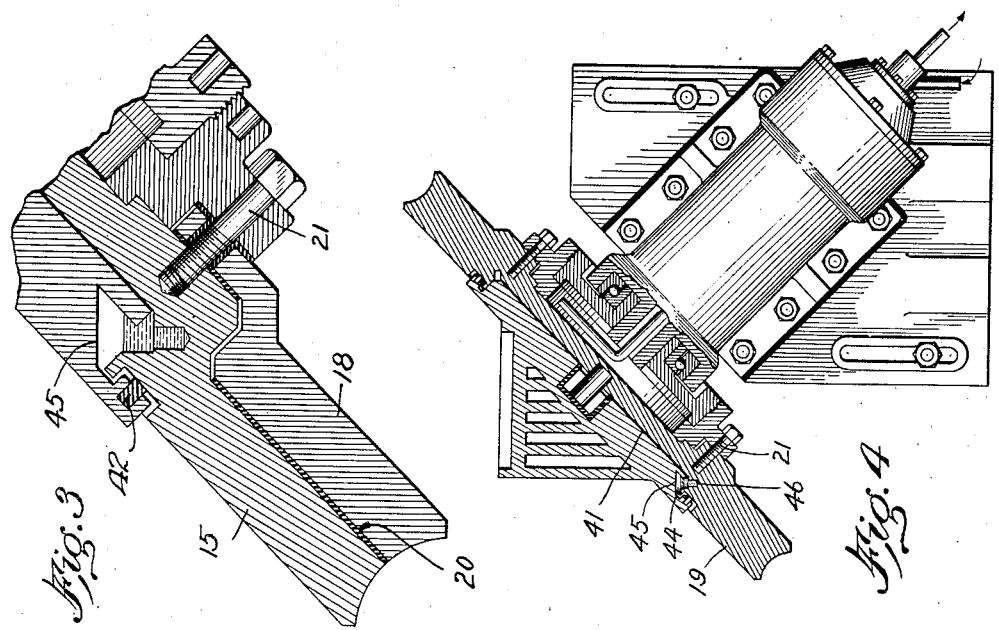
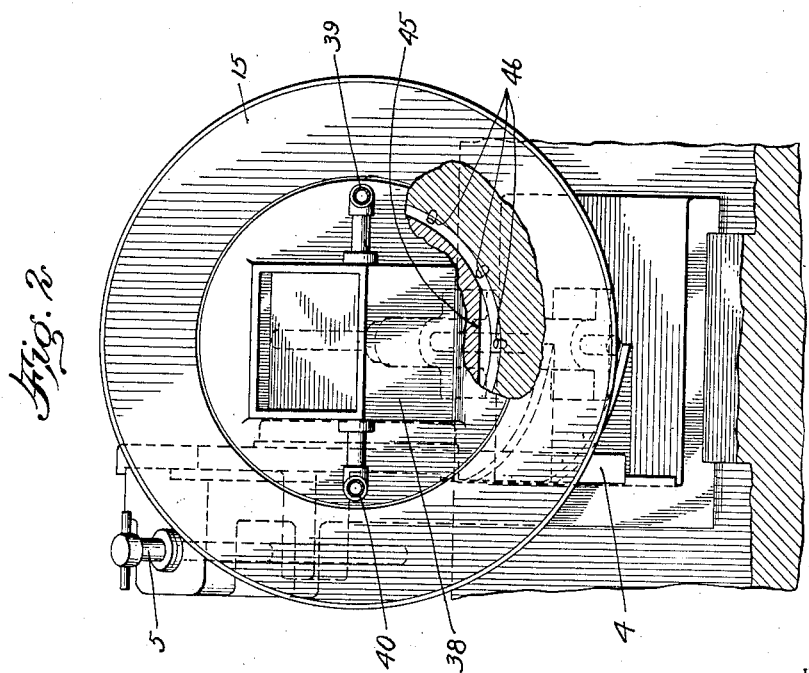

May 19, 1931.  J. F. LAWSON  1,805,549
ELECTRIC WELDING
Filed Aug. 27, 1925  3 Sheets-Sheet 3
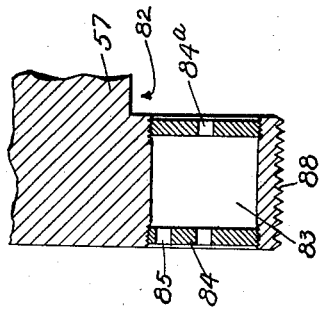
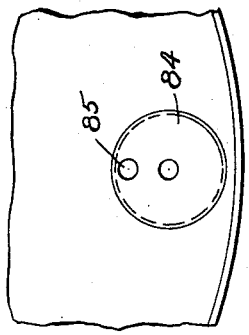
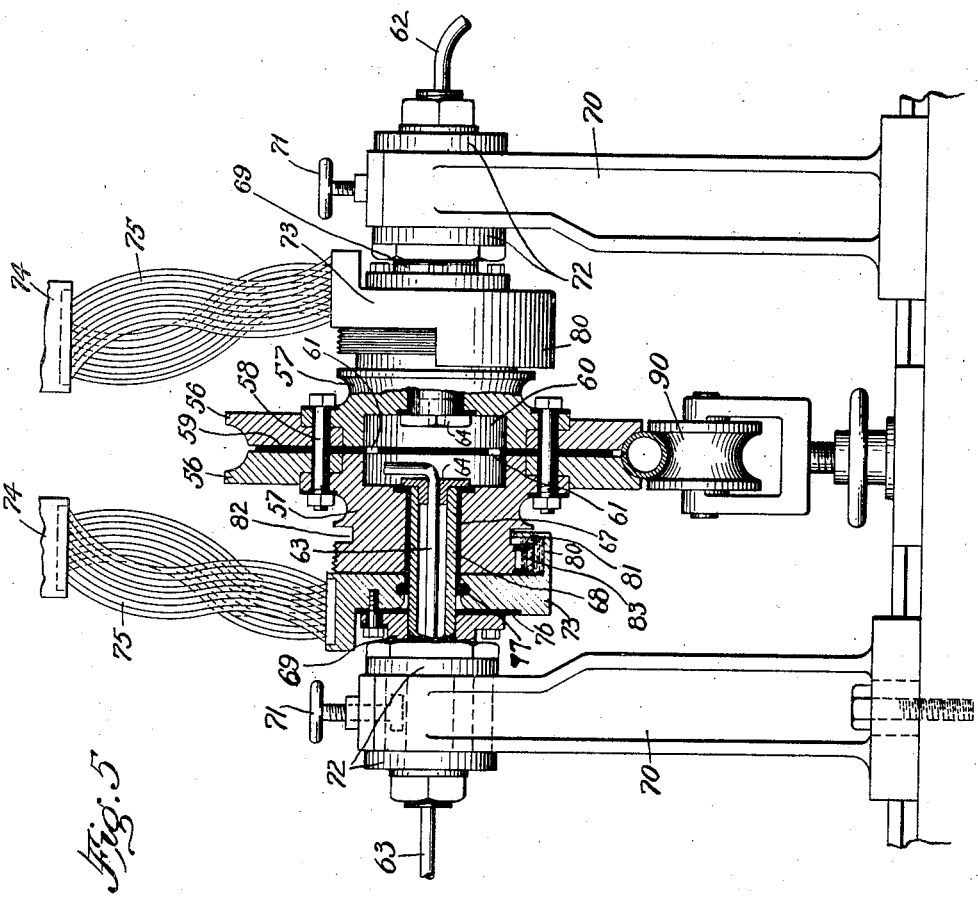

Patented May 19, 1931

1,805,549

UNITED STATES PATENT OFFICE

JOHN F. LAWSON, OF BROOKLYN, NEW YORK

ELECTRIC WELDING

Application filed August 27, 1925. Serial No. 52,727.

My invention concerns the roller electrodes and associated parts of electric-resistance tube welders and analogous machines. These roller electrodes, it will be understood, bear on the hot softened metal adjacent the seam being formed and are called on to exert considerable pressure on the tube in order to effect the weld.

Ordinarily also they are turned by their frictional engagement with the tube itself as the tube stock passes through the machine. It is important, therefore, that the supporting bearings of these rolls be as frictionless as possible in order that the rolls may turn with little effort, for otherwise the tube may slip under the electrodes and softened metal worn and torn off. Also it is important that the electrical connections to these rollers introduce as little friction as possible, and be as efficient as may be to avoid losses and to assure uniform welding of the long seams. To these ends I have previously proposed relieving the supporting bearings of the electrodes of the function of carrying the welding current to the latter, thereby permitting these bearings to be of any desirable anti-friction type, and I have proposed making the electrical connections to the electrode through mercury or other conducting liquid thus avoiding friction at this point and making an efficient electrical connection. I have disclosed and claimed such an arrangement in a copending application Serial No. 529,031, filed January 13, 1922. In the form therein shown the mercury space is provided between the side walls of nested cylinders, one or more of which is attached to and turns with the electrode while the remainder are stationary and connected to the transformer terminals.

The present invention utilizes the same principles of a liquid connection for the electric current independent of the supporting bearings of the electrodes, but is an improvement on the construction shown in the said application and has among its objects a more compact construction, one requiring a smaller quantity of mercury, one wherein the electric connection can be made, if desired, on the opposite side of the electrode from the bearing in which the electrode is carried, and which permits the circuit of the welding current to be materially shortened and does not require the welding circuit to enclose the work. According to the present invention I form a mercury-containing crevice between an end face of the electrode or a rotating body which turns with it, and the proximate face of a stationary body connected to the terminals of the welding transformer, the crevice being, in general, at substantially right angles to the axis of rotation of the electrode and being preferably flat or plane and parallel to the diameters of the electrode although it may be dished and need not be regular. Also I provide for continually replenishing and circulating the mercury in the space or crevice, preferably by means continually raising mercury from a sump or well to near the top of the mercury space or crevice as herein described, regardless of the form of the space or crevice. These two features of my invention may be and preferably are used in conjunction with each other. I prefer to use mercury between the stationary body and the rotating body as indicated, both because it is a fairly good conductor of current, having a fairly high specific conductivity, and because of its lubricating or friction-reducing action, whereby it permits the electrodes to turn much easier than though the contact between the surfaces were a dry-metal one. The area of contact between the stationary body and the rotating body is readily made so large, however, that the importance of high-conductivity is not of the greatest. A lubricating or friction-reducing effect is desirable, however, as before indicated. Other elements of my invention appear hereinafter.

It will be understood that while for the most part I refer herein to mercury as the electrically conducting liquid, I include therewith any other liquids of high conductivity suitable for the same purpose.

The invention is illustrated in the accompanying drawings:

Fig. 1 is an elevation, partly in section, of a portion of a common form of welding machine, adjacent to the welding throat, to which my invention is applied.

Fig. 2 is an elevation, partly in section, of the inner face of one of the electrodes and associated parts of Fig. 1, looking at the same at a downward inclination of 45° from the vertical.

Fig. 3 is a detail of a portion of Fig. 1, drawn to a larger scale.

Fig. 4 is an elevation, partly in section, of an electrode structure embodying my invention, illustrating a different form of electrode.

Fig. 5 is an elevation, partly in section, of a somewhat different form of welding machine with my invention applied.

Fig. 6 is a section of a detail of Fig. 5, and Fig. 7 is an elevation of the same detail.

Referring first to Figs. 1, 2 and 3: The base or frame 1 of the welding machine illustrated carries two electrode supports 2 which are slidable to and from each other in ways under the control of threaded bolts 3. A platen 4 on each of these supports is raised and lowered vertically by means of the vertical threaded bolts 5 and carries a plate 6 to which the supporting bearing of the electrodes are fixed. A layer 7 of suitable insulation interposed between the plate 6 and the platen 4, and insulating sleeves and collars on the bolts which connect the plate and platen electrically insulate the electrodes from each other and from the frame of the machine. The bolts 3 and 5 serve to adjust the electrodes with respect to the tube to be welded. Ball bearings 9, carrying the shaft 10 fixed to the respective electrode, are supported in the member 8 which is built out from the plate 6; these ball bearings 9 may be constructed to support both radial and axial thrusts as herein shown. The electrode itself comprises the disk member 15 set at an angle of about 45° to the horizontal; in a usual manner the electrode edge is curved to generally correspond to the periphery of the tube 16 being welded, and its "toe" or corner nearest the seam 17 bears onto the tube metal rather close to the seam. In the present instance the electrode 15, which is customarily made of copper or some similarly good conductor of electricity, is backed up by a disk or annulus 18 of insulating material or of metal insulated from the welding current; its purpose is to increase the traction of the tube on the rolling structure and thereby assist in turning the electrode without slipping. This backing disk or annulus 18 is rigidly connected to the electrode 15, and its edge is also grooved consonant to the periphery of the tube 16 and spans a considerable part of the periphery of the tube. This dual construction of the electrode is not an essential part of my present invention however, but the rolling unit may consist simply of the ordinary good electrical conductor, one example of which, also spanning a considerable arc on the tube, nearly 90°, for traction purposes, is illustrated at 19 in Fig. 4. The dual construction is preferable however, inasmuch as this construction, arranged with the electrode at a considerable angle to the horizontal, is not only like the unit construction in Fig. 4 in that it both exerts seam-closing pressure more or less radially on the tube close to the seam 17 and affords adequate traction to turn the rolling structure without wearing and tearing the tube metal, but also it requires less current to effect a weld than the more usual form of Fig. 4, due, I believe, to less current being passed around the tube on the side opposite the seam. The disk or annulus 18, if of metal, may be insulated from the welding current by means of an insulating annulus 20 and insulating collars and sleeves about the attaching bolts 21 as illustrated. In the present instance a collar 22 is shrunk on the shaft 10 and threaded into a ring 23; the bolts 21 project through a flange on this ring and through the annulus 18 and are threaded into the electrode 15. The electrode 15 and/or the annulus 18 can thus be readily removed for replacement, repair or regrinding. Customarily I provide a space 28 in the electrode through which I circulate a fluid, such as water, for cooling the electrode. This cooling water is introduced through the pipe 29, opening to a passage through the shaft 10, and escapes through the interior pipe 30a in a manner which will be understood from the drawings, and suitable glands are provided at the base of the shaft 10 and the electrode structure. One or more support rolls 29 support the tube in opposition to the pressure exerted by the electrodes in the customary manner; this support roller or these support rollers is or are carried by the base or frame 1 of the machine and is or are adjustable as by the hand wheel 30.

For the most part the foregoing may be regarded as representative of tube welders of the type in which the two electrodes are separate structures. The terminals of the secondary winding of the welding transformer are indicated at 34, the welding transformer in this instance being placed above the welding machine. From these terminals flexible leads 35 carry the current to a stationary body 36, one for each of the electrodes, and preferably on the opposite side of the electrode from its shaft 10 and supporting bearing. This body 36 is arcuate (so as to have, by more or less encircling the axial line of the rotating electrode, an extended area or face through which current can flow to or from the electrode), and is of good conducting material, such as copper, and preferably has the form of a disk or annulus provided with a cooling passage or passages 37 in a protuberance 38 therefrom; pipes 39 and 40 provide for the inflow and outflow of the cooling fluid through said passages. The end face of the rotating electrode and the proximate face of the stationary body 36 are in close juxtaposition for direct current flow from one face to the whole surface of the other face, having at most only a narrow crevice 41 between them, the plane of which is at right angles to the axis of rotation of the electrode. This crevice contains mercury or other suitable electrical conducting liquid which completes the connection from the respective transformer terminal 34 to the rotating electrode; a gasket 42 in an overhanging lip on the stationary member and bearing in a groove in the electrode may be used to prevent the escape of the mercury. This crevice, it will be observed, is substantially parallel to the plane of the diameters of the electrode 15 (or 15 and 18, or 19), that is to say, the thickness or dimension of the crevice parallel to the axis of rotation of the electrode is less than the dimension of the crevice substantially perpendicular to said axis, and the crevice encircles the axial line of rotation of the electrode. This construction requires only a very thin film of mercury.

To provide for replenishing and circulating the mercury through the crevice 41, I provide a sump, well or reservoir 44 at the lowest point of the crevice 41 into which the mercury may drain. In the present instance this well or reservoir is provided by cutting off a part of the curved edge of the disk 36, as illustrated at 45. From this well or sump, buckets on the rotating structure carry mercury to or near the top of the crevice; in the present instance these bucket means are provided by a number of cavities 46 bored into the electrode. It will be observed that mercury from the well or reservoir 44 fills these cavities 46 as they are successively turned beneath the well or reservoir 44, and as these cavities rise with the turning of the electrodes they empty their mercury into the crevice 41 in so far as the crevice is able to receive it.

In the present instance the stationary body 36 is held in place by its own weight resting on the film of mercury in the crevice 41 and also on a pin 50 driven into the electrode and turning in a bearing 51 in the stationary body 36. The pin 50 may serve (see Figs. 1 and 4) to space the stationary body 36 from the electrode, that is to say, to regulate the clearance between the two. For this purpose the head of the pin may form, or there may be provided at one end of the pin or otherwise a thrust bearing to more or less support the thrust of the stationary member toward the electrode face. A cross bar 52 attached to each of the stationary bodies 36 and some suitable stationary member on the welding machine will keep the stationary bodies from rotating along with the electrode.

The construction just described is not only representative of the whole or substantially the whole of my invention, but also the placement of the stationary current-supplying bodies 36 between the roller electrodes 15, and the placement of the stationary members 36 and the supporting bearings 8, 9, 10 at opposite sides of the respective electrodes 15, illustrates particularly the general manner in which I achieve the heretofore stated objects of a compact construction, a shortened circuit for the welding current, and a welding current circuit which does not enclose the work. As heretofore pointed out, the area of contact between each stationary body 36 and its related rotating body 15 is readily made so large in such constructions that high conductivity per unit area at this point is not of the greatest importance. Accordingly (and as hereafter appears from certain of the claims) it is not altogether an essential of this part of my invention that a liquid of high specific conductivity be employed in the crevice of such arrangements. Preferably however some friction-reducing material is employed at the crevice, as has also been pointed out, and preferably this material is a liquid; more preferably it is a liquid of a fairly high electrical conductivity, and most preferably it is mercury.

Figs. 1, 2, 3 and 4 illustrate the mercury crevice on the inner face of the rotating electrodes and opposite the bearings. In Figs. 5, 6 and 7 I have illustrated the application of my invention to a somewhat different type of machine, the mercury crevice being on the outer faces of the electrodes and on the same sides of the electrode as the bearings. As appears in Fig. 6 the electrodes in this machine are vertical and parallel and mechanically fixed together. Each electrode per se comprises an annulus 56 and for mechanical reasons the member 57 is made as a separate unit. Both may be of good conducting material. All four of the members 56 and 57 are fastened together by bolts 58 with a sheet of insulating material 59 interposed between the members 56 as illustrated and with sleeves and collars insulating the bolts 58 from one or both of the electrodes, so that the two electrodes are separated electrically; each member 57 makes metal to metal contact with its electrode 56 and hence is electrically connected to it. The two electrode structures are hollowed out to provide a common space 60 for cooling fluid, and preferably the insulating member 59, or another insulating member, divides this space into two chambers, one for each of the electrodes as shown in Fig. 5. This insulation is provided with a perforation or perforations which are substantially only adequate to provide for the passage of the cooling fluid from one side to the other; preferably a number of small holes 61 displaced from the axis of rotation of the electrode structure and near the periphery of the chamber 60 are employed. By thus minimizing the cross area of the fluid connection between the chambers in the two electrodes, I reduce the current wasted by conduction direct from one electrode to the other through the cooling fluid. The cooling fluid is introduced by a pipe 62 entering one of the chambers of the space 60 through one of the electrode shafts and conveyed away by a pipe 63 passing out through the other hollow electrode shaft. The shaft opening in each member 57 is lined with a tight-fitting insulating sleeve 67 into which is forced or driven a shaft 68 which is hollow to provide for the passage of the pipe 62 or 63, as the case may be; plugs 64 prevent the escape of the cooling fluid into the hollow shafts. Each of these shafts turns in a bearing or journal box 69, slideable vertically in a bearing standard or support 70 as directed by the threaded bolt and hand wheel 71. Thereby the electrode structure can be raised and lowered as the dimensions of the pipe being welded or other conditions may require. Thrust bearings 72 are provided for each box on opposite side of its support 70. These journal boxes 69, it will be understood, are non-rotating and preferably contain bearings which permit the shafts 68 to turn with as little effort as possible. To an inner flange of each journal box is bolted the stationary annular conducting member 73 between which and the outer end face of the adjacent rotating electrode member 57 is formed the narrow crevice containing the mercury or other conducting liquid. The secondary terminals 74 of the transformer are connected to the stationary member 73 by means of the flexible leads 75 and the members 73 are insulated from the respective boxes 69 by layer insulation 76 and sleeves and collars on the connecting bolts. A gasket 77 prevents the escape of the mercury along the shaft toward the journal box. The well or sump in this instance is formed by a flange 80 on the member 73 which more or less encircles the adjacent member 57; an inturned lip 81 completes the closure of the well or sump and projects into an annulus groove 82 in the member 57. The bucket means for raising mercury from this well or sump to or near the top of the crevice are provided by boring through the flange on the member 57 formed by the annular groove 82, as indicated at 83 (Figs. 5 and 6) and screwing in perforated plugs 84 and 84a. The plug 84a is perforated at its center. The plug 84 adjacent the member 73, is perforated at its center and also at the edge thereof remote from the periphery of the member 57. When a bucket dips into the well, therefore, the bucket is more or less filled by mercury entering the center perforation or perforations of the plug or plugs 84 and 84a and at least half of this mercury is retained in the cavity 83 until the respective cavity approaches the top arc of the crevice, at which time the mercury begins to flow out through the perforation 85 to replenish the crevice.

To avoid some possible loss of mercury owing to the fact that a broad edge of the flange on the member 57 dips into the well and may pick up some of the mercury, I may provide this edge of the flange with screw threads 88, so cut therein with respect to the direction of rotation of the electrodes that the mercury therein is moved toward the crevice and away from the annular groove 82; the threads therefore may assist in replenishing and circulating the mercury.

It will be observed that both electrodes being fastened together by the bolts 58, and each being fastened to its own shaft 68 which is held in its box 69 and the latter to its own standard 70 by the thrust bearings 72, the rolling structure is capable of holding the standards 70 in proper position with respect to each other. Therefore for simplicity of construction and adjustment I may bolt only one of the standards fast to the base of the machine (for example, the lefthand standard 70 as illustrated), leaving the other standard free to slide in the ways in which both standards are located. The supporting roll or rolls 90 opposing the downward thrust of the electrodes may likewise be carried on a freely sliding member in ways in the machine base, being held to its proper position by its engagement with the tube and the engagement of the tube in the edge groove of the electrodes.

It will be understood that my invention is not limited to the details of construction hereinbefore described, except as appears hereafter in the claims.

I claim:

1. In an electric welding machine of the kind indicated, means effecting an electrical connection between a roller electrode thereof and the transformer comprising a rotating body and a stationary body, a crevice being formed between an end face of said rotating body and the proximate face of the stationary body, and an electrically conducting fluid in said crevice.

2. In an electric welding machine of the kind indicated, a pair of roller electrodes, means to provide an electrical connection to one of said electrodes comprising a stationary member located between said electrodes and having an extended surface to co-act with a surface on a rotating part on said one of the electrodes, said surfaces being so disposed that the shortest dimension of the crevice between them has a component parallel to the axis of rotation of the electrode, and a material in said crevice between said surfaces reducing the friction.

3. In an electric welding machine of the kind indicated, a stationary body, a roller electrode between an end face of which and the proximate face of said stationary body a crevice is formed, the plane of substantially the whole of said crevice being at substantially right angles to the axis of rotation of said roller electrode, and a conducting liquid in said crevice for conducting the welding current between said stationary body and the electrode.

4. In an electric welding machine of the kind indicated, a rolling disk electrode member, a bearing therefor, a stationary member, a crevice being formed between an end face of said electrode member and the proximate face of the stationary member, the plane of substantially the whole of said crevice being at substantially right angles to the axis of rotation of said electrode member and said crevice encircling the axial line of rotation of said electrode member, and a conducting liquid in said crevice for conducting welding current between said electrode and stationary member.

5. An electric welding machine having a roller electrode structure, a supporting bearing therefor, a stationary member encircling the axial line of said rotating structure, said member being placed with a face thereof in close juxtaposition to an end face of said electrode structure so that a crevice is provided between said end face of the electrode structure and the proximate face of said stationary member, the plane of substantially the whole of which crevice is at substantially right angles to the axis of rotation of said electrode structure, and an electrically conducting liquid in said crevice forming the connection for the welding current between said stationary member and said electrode structure.

6. In an electric welding machine of the kind indicated, means effecting an electrical connection between a roller electrode thereof and the transformer comprising a rotating body and a stationary body, a crevice being formed between an end face of said rotating body and the proximate face of the stationary body, and an electrically conducting fluid in said crevice, and means for moving fluid from one position of said crevice to another.

7. In an electric welding machine, a roller electrode structure set at an angle to the horizontal, a bearing therefor, a stationary member, a crevice being formed between an end face of said electrode structure and the proximate face of the stationary member, said crevice encircling the axial line of rotation of said electrode member, a conducting liquid in said crevice for conducting welding current between said electrode structure and stationary member, a well for receiving liquid from said crevice being provided adjacent a low point of the latter, and bucket means on the roller electrode structure for taking liquid from said well and delivering said liquid to said crevice at a higher point on the latter.

8. In an electric welding machine having a roller electrode structure, and means forming a connection thereto for the welding current comprising a stationary body and a conducting liquid in a space between said stationary body and the roller electrode structure, a well being provided into which the liquid may flow from said space between said body and structure, and means being provided on the roller structure for raising liquid from said well and returning it to said space as said roller structure turns.

9. In an electric welding machine having a roller electrode structure, means forming a connection thereto for the welding current comprising a stationary body and a conducting liquid in a space between said stationary body and the roller electrode structure, a space being provided in which said conducting liquid may collect, and means for returning said liquid from said collecting space to a point in said liquid containing space between said stationary body and the roller electrode structure.

10. In an electric welding machine having a roller electrode structure, means forming a connection thereto for the welding current comprising a stationary body and a conducting fluid in a space between said stationary body and the roller electrode structure, and means for maintaining a circulation of said fluid in said space.

11. In an electric welding machine having a roller electrode structure, means forming a connection thereto for the welding current comprising a stationary body and a conducting liquid in a space between said stationary body and the roller electrode structure, and means for continually replenishing the conducting liquid in the said space therefor.

12. In an electric welding machine, a roller electrode, a supporting bearing therefor at one side of said electrode, a stationary member on the opposite side of said electrode, a crevice being formed between the face of said electrode opposite said bearing and the proximate face of said stationary member, the plane of substantially the whole of which crevice is at substantially right angles to the axis of rotation of said electrode, and a conducting fluid in said crevice to complete the connection for the welding current to said electrode.

13. In an electric welding machine, a roller electrode, a supporting bearing therefor at one side of said electrode, a stationary member having an arcuate face disposed for direct current flow between the whole surface of said face and the opposite face of said electrode from said bearing for conducting the welding current to said electrode and a material between said two faces reducing the friction.

14. In an electric welding machine for progressive welding, a pair of electrodes to traverse the work on opposite sides of the seam, stationary members placed between the electrodes to conduct current thereto, each of said members having an arcuate face disposed for direct current flow between the whole surface of said face and the proximate face of one of said electrodes, bearings at the sides of the electrodes to support the electrodes and a material between the face of each of said members and the cooperating face of its electrode reducing the friction therebetween.

15. In an electric welding machine for progressive welding, a pair of roller electrodes to roll on the surface of the work on opposite sides of the seam, stationary disks placed between the electrodes and each arranged for direct current interchange between an electrode and the whole surface of a face of the disk to conduct current to the electrodes and a material between each disk and its cooperating faces reducing friction, and a bearing for each electrode, to support the same, on the side of the respective electrode opposite the said stationary disk which conducts current to it.

16. In an electric welding machine for progressive welding, a pair of roller electrodes to roll on the surface of the work on opposite sides of the seam, a stationary arcuate member, placed between the electrodes, arranged for the direct passage of current from the whole of a face of said arcuate member to the proximate surface of each electrode on the inner face thereof between the electrodes, a material between said cooperating faces reducing friction, a shaft extending to the outer face of each electrode, and a bearing to support each electrode engaging the respective shaft.

17. The subject matter of claim 16, characterized by the fact that said material between each stationary member and the surface on the electrode to which it conducts current is a liquid.

18. In an electric welding machine for progressive welding, a pair of electrodes to roll on the work on opposite sides of the seam, a stationary arcuate member between the electrodes arranged for the direct passage of current from the whole of a face of said arcuate member to a surface on the face of each electrode which is substantially perpendicular to the axis of the respective electrode, a material between said cooperating faces reducing friction and a supporting bearing for each electrode at the side of the electrode opposite the respective current-conducting member.

19. In an electric welding machine for progressive welding, a pair of roller electrodes to roll on the work on opposite sides of the seam, stationary members of opposite polarity between the electrodes to conduct current to surfaces on the inner faces of the electrode, each of said surfaces being substantially perpendicular to the axis of its electrode, and surrounding such axis, and the stationary members having corresponding surfaces through which the current is conducted to the said surfaces on the electrodes, a material interposed between each stationary surface and its electrode to reduce friction, a shaft extending to the back of each electrode, and a bearing to support each electrode engaging the respective shaft.

20. The subject matter of claim 19, the mentioned faces of each stationary member and its electrode defining a crevice between the respective stationary member and its electrode, characterized by the fact that said material to reduce friction is in said crevices and comprises a liquid.

21. The subject matter of claim 19, the mentioned surfaces of each stationary member and its electrode defining a crevice between the respective stationary member and its electrode, characterized by the fact that said material reducing friction is located in said crevices and comprises a liquid of fairly high specific conductivity.

22. The subject matter of claim 19, said material reducing friction being a material of fairly high specific conductivity.

23. In an electric welding machine, a pair of disc-like roller electrodes arranged to engage the work at opposite sides of the seam, flat faces of the electrodes facing each other and each electrode having a circular metal portion to engage the work adjacent the seam to conduct the welding current thereto, means to conduct the welding current to the electrodes comprising two stationary members between the electrodes, one of said members bearing on the proximate flat face of each electrode and bearing on such face of its electrode at opposite sides of the axis of the respective electrode, and a shaft for supporting each electrode, each shaft extending to the face of its electrode opposite the face thereof receiving the respective stationary member.

24. In an electric welding machine of the kind indicated, a rotating body including a roller electrode, a cooperating stationary part forming with said rotating body a crevice, the dimension of which crevice parallel to the axis of rotation of said body is less than the dimension of said crevice substantially perpendicular to said axis, an electrically conducting liquid in said crevice, and means for supplying welding current to said roller electrode, said means being connected to said stationary part so that the welding current passing between said means and the roller electrode passes through said stationary part and said conducting liquid.

25. In an electric welding machine, a roller electrode, a supporting bearing therefor, a stationary member to conduct current to said electrode, said stationary member carrying the current to an end face of the electrode substantially the whole of which current-carrying face is at substantially right angles to the axis of rotation of said electrode, a fluid between the electrode and stationary member, and means to regulate the clearance between the electrode and the stationary member.

26. In an electric welding machine, a roller electrode, a supporting bearing therefor, a stationary member to conduct current to said electrode, said member facing an end face of the electrode, means between the electrode and stationary member to resist the thrust of the stationary member toward the electrode and provide a crevice between the two, the plane of substantially the whole of which crevice is at substantially right angles to the axis of rotation of said electrode, and a fluid in the crevice to reduce the friction.

27. In an electric welding machine, a roller electrode, a supporting bearing therefor, a stationary member facing an end face of the electrode to conduct current thereto, and a thrust bearing substantially on the axial line of the electrode to resist thrust of the stationary member toward the electrode.

In testimony whereof, I have signed this specification.

JOHN F. LAWSON.